(12) United States Patent
Namihisa et al.

(10) Patent No.: US 10,629,244 B1
(45) Date of Patent: Apr. 21, 2020

(54) SEALED ELECTRICAL FEED-THROUGH HAVING REDUCED LEAK RATE

(71) Applicant: Western Digital Technologies, Inc., San Jose, CA (US)

(72) Inventors: Miki Namihisa, Fujisawa (JP); Shin Nagahiro, Nakagun-Ninomiya (JP); Hiroshi Matsuda, Yokohama (JP); Satoshi Nakamura, Yokohama (JP)

(73) Assignee: Western Digital Technologies, Inc., San jose, CA (US)

( * ) Notice: Subject to any disclaimer, the term of this patent is extended or adjusted under 35 U.S.C. 154(b) by 0 days.

(21) Appl. No.: 16/414,641

(22) Filed: May 16, 2019

Related U.S. Application Data

(60) Provisional application No. 62/757,115, filed on Nov. 7, 2018.

(51) Int. Cl.
 *G11B 33/14* (2006.01)
 *G11B 25/04* (2006.01)
 *G11B 33/12* (2006.01)

(52) U.S. Cl.
 CPC ........ *G11B 33/1466* (2013.01); *G11B 25/043* (2013.01); *G11B 33/122* (2013.01)

(58) Field of Classification Search
 CPC .. G11B 33/1466; G11B 33/122; G11B 25/043
 USPC ...................................... 360/99.25
 See application file for complete search history.

(56) References Cited

U.S. PATENT DOCUMENTS

| | | | |
|---|---|---|---|
| 6,016,000 | A | 1/2000 | Moslehi |
| 6,970,322 | B2 | 11/2005 | Bernett |
| 6,989,493 | B2 | 1/2006 | Hipwell, Jr. et al. |
| 7,019,942 | B2 | 3/2006 | Gunderson et al. |
| 7,137,196 | B2 | 11/2006 | Gunderson et al. |
| 7,599,147 | B2 | 10/2009 | Gunderson |
| 8,035,923 | B2 | 10/2011 | Suzuki et al. |
| 8,098,454 | B2 | 1/2012 | Kouno et al. |
| 8,194,348 | B2 | 6/2012 | Jacoby et al. |

(Continued)

FOREIGN PATENT DOCUMENTS

| | | |
|---|---|---|
| CN | 104953335 A | 9/2015 |
| EP | 0844899 B1 | 7/2003 |

OTHER PUBLICATIONS

Sudo et al., Flexible Type Electrical Feed-Through, U.S. Appl. No. 16/005,648, filed Jun. 11, 2018, Applicant: Western Digital Technologies, Inc.

(Continued)

*Primary Examiner* — Allen T Cao
(74) *Attorney, Agent, or Firm* — John D. Henkhaus

(57) ABSTRACT

An electrical feed-through involves a laminate structure having alternating insulator and metal layers with electrically conductive through-holes formed therethrough, by which a lower connector pad is electrically connected with a corresponding upper connector pad, and wherein the number of through-holes is less than the number of connector pads on either side. Thus, the chain of clearances associated with the through-holes on the inner metal layer(s) is reduced, which provides more leak resistant metal material within the metal layer(s), while maintaining suitable electrical performance and avoiding disruption of existing manufacturing. Such a feed-through may be used at an interface between a hermetically-sealed internal environment, such as in a lighter-than-air gas filled data storage device, and the external environment.

21 Claims, 12 Drawing Sheets

(56) References Cited

U.S. PATENT DOCUMENTS

| | | |
|---|---|---|
| 8,593,760 B2 | 11/2013 | McGuire, Jr. |
| 8,659,849 B2 | 2/2014 | Hayakawa et al. |
| 9,230,598 B1 | 1/2016 | Bernett et al. |
| 9,490,620 B1 | 11/2016 | Albrecht et al. |
| 9,558,790 B1 | 1/2017 | Onobu et al. |
| 9,870,806 B2 | 1/2018 | Onobu et al. |
| 9,886,984 B2 | 2/2018 | Akagi et al. |
| 2004/0057589 A1 | 3/2004 | Pedersen et al. |
| 2011/0211279 A1 | 9/2011 | Jacoby et al. |
| 2015/0139770 A1 | 5/2015 | Moura et al. |

OTHER PUBLICATIONS

Namihsa et al., Flexible Type Electrical Feed-Through Connector Assembly, U.S. Appl. No. 16/231,493, filed Dec. 22, 2018, Applicant: Western Digital Technologies, Inc.

Namihsa et al., Misalignment-Tolerant Type Electrical Feed-Through, U.S. Appl. No. 16/231,499, filed Dec. 22, 2018, Applicant: Western Digital Technologies, Inc.

SEALED ELECTRICAL FEED-THROUGH HAVING REDUCED LEAK RATE

CROSS-REFERENCE TO RELATED APPLICATIONS

This application claims the benefit of priority to U.S. Provisional Patent Application Ser. No. 62/757,115, entitled "Printed Circuit Board Type Sealed Electrical Feed-Through Connector" filed Nov. 7, 2018, the entire content of which is incorporated by reference for all purposes as if fully set forth herein.

FIELD OF EMBODIMENTS

Embodiments of the invention may relate generally to a data storage device and particularly to approaches to an electrical feed-through for a lighter-than-air gas-filled hard disk drive.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head that is positioned over a specific location of a disk by an actuator. A read-write head makes use of magnetic fields to write data to, and read data from, the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

HDDs are being manufactured which are hermetically sealed with helium inside. Further, other gases that are lighter than air have been contemplated for use as a replacement for air in sealed HDDs. There are various benefits to sealing and operating an HDD in helium ambient, for example, because the density of helium is one-seventh that of air. Hence, operating an HDD in helium reduces the drag force acting on the spinning disk stack, and the mechanical power used by the disk spindle motor is substantially reduced. Further, operating in helium reduces the flutter of the disks and the suspension, allowing for disks to be placed closer together and increasing the areal density (a measure of the quantity of information bits that can be stored on a given area of disk surface) by enabling a smaller, narrower data track pitch. The lower shear forces and more efficient thermal conduction of helium also mean the HDD will run cooler and will emit less acoustic noise. The reliability of the HDD is also increased due to low humidity, less sensitivity to altitude and external pressure variations, and the absence of corrosive gases or contaminants. However, electronic systems that require hermetically sealed internal volume (e.g., a lighter-than-air gas filled, sealed HDD or system of HDDs) need a way of connecting electrical lines through the enclosure. This is typically accomplished with a hermetic electrical connector, or electrical "feed-through".

Increasing hard disk drive (HDD) capacity is an ever-present design goal. Increasing capacity while not degrading performance (as may be characterized by IOPS (I/O per second)) is one important design requirement, as is conservation of power. In the context of a sealed HDD, a sealed feed-through connector is needed to support the signals from internal components to the external printed circuit board (PCB). Low permeability but relatively expensive glass feed-through and low-cost but higher leak rate printed circuit board (PCB) type sealed feed-through ("PCB feed-through") assemblies offer various approaches to a sealed feed-through electrical connector assembly. Additionally, use of a flexible type feed-through connector assembly ("flex feed-through"), such as described in U.S. patent application Ser. No. 16/005,648 entitled "Flexible Type Electrical Feed-Through" (the entire content of which is incorporated by reference for all purposes as if fully set forth herein), may improve the leakage issue due to a smaller size Board-to-Board (BTB) connector. However, a PCB feed-through typically has a higher leak rate than a flex feed-through, even if at a lower cost than a flex feed-through.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Generally, approaches to a sealed electrical feed-through having a more desirable (reduced) leak rate are described. References in this specification to "an embodiment", "one embodiment", or the like, mean that the particular feature, structure or characteristic being described is included in at least one embodiment of the present invention. However, occurrences of such phrases in this specification do not necessarily all refer to the same embodiment. In the following description, for the purposes of explanation, numerous specific details are set forth in order to provide a thorough understanding of the embodiments of the invention described herein. It will be apparent, however, that the embodiments described herein may be practiced without these specific details. In other instances, well-known structures and devices may be shown in block diagram form in order to avoid unnecessarily obscuring the embodiments described herein.

Physical Description of an Illustrative Operating Context

Embodiments may be used in the context of a digital data storage device (DSD), such as a hard disk drive (HDD) or a sealed HDD in particular. Thus, in accordance with an embodiment, a plan view illustrating an HDD 100 is shown in FIG. 1 to illustrate an exemplary operating context.

Figure 1:
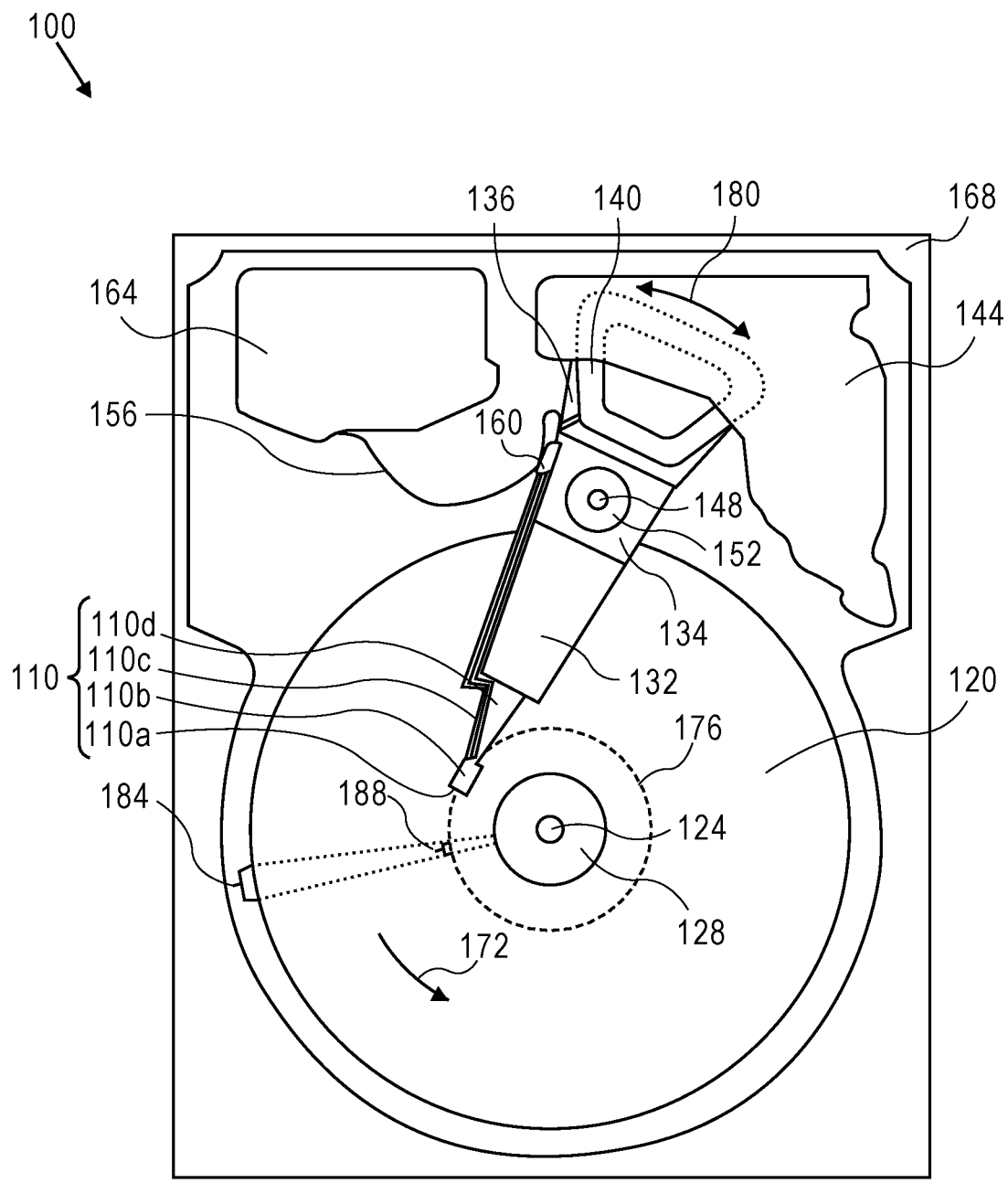
FIG. 1 is a plan view illustrating a hard disk drive (HDD), according to an embodiment.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

The term "hermetic" will be understood to describe a sealing arrangement designed to have nominally no (or negligible) gaseous leakage or permeation paths. While terms such as "hermetic", "hermetically-sealed", "sealed", "negligible leakage", "no leakage", etc. may be used herein, note that such a system would often still have a certain amount of permeability and, therefore, not be absolutely leak-free. Hence, the concept of a desired or target "leak rate" may be used herein.

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

While terms such as "optimal", "optimize", "minimal", "minimize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Recall that electronic systems that require hermetically sealed internal volume (e.g., a lighter-than-air gas filled, sealed HDD or system of HDDs) need a way of connecting electrical lines through the enclosure, with one approach utilizing a hermetic electrical connector or electrical "feed-through". However, challenges remain regarding a low leakage rate versus the cost of a suitable electrical feed-through.

Figure 2:
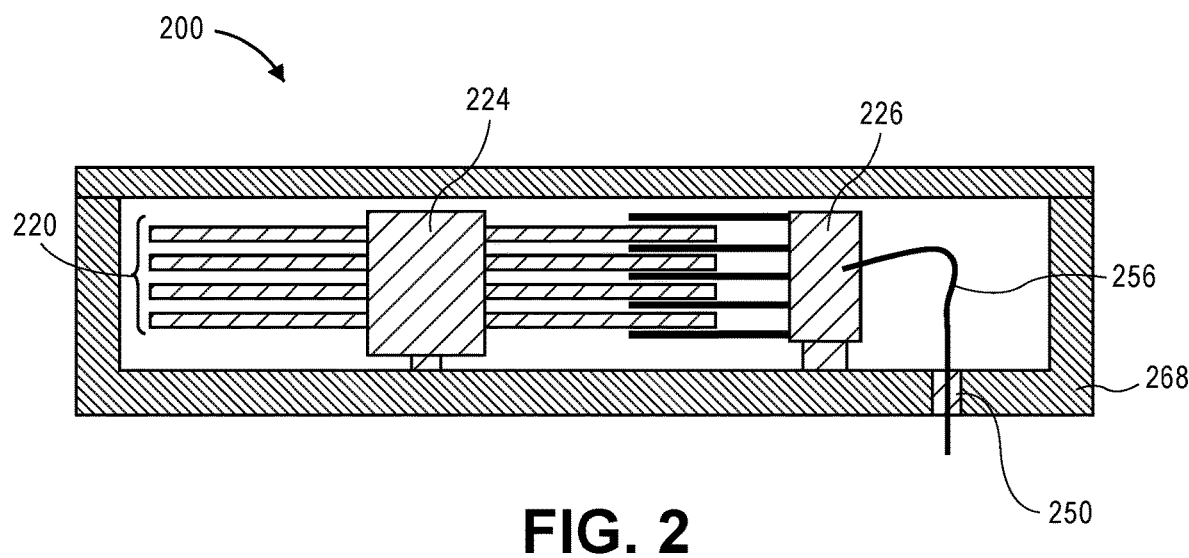
FIG. 2 is a cross-sectional side view illustrating a hard disk drive (HDD), according to an embodiment.

FIG. 2 is a cross-sectional side view illustrating a hard disk drive (HDD), according to an embodiment. For example, HDD 200 comprises at least one recording medium 220 (e.g., such as magnetic-recording medium 120 of FIG. 1) rotatably mounted on a spindle 224 (e.g., such as spindle 124 of FIG. 1) of a drive motor that drives the rotation of the recording medium 220, and a head stack assembly (HSA) 226 that carries and moves a head slider housing a read-write transducer to locations over the recording medium 220 for reading information from and writing information to the recording medium 220. HDD 200 further comprises a flexible cable assembly (FCA) 256 that electrically connects the HSA 226 to an electronic component external to the hermetically-sealed internal environment of HDD 200, such as to a printed circuit board (e.g., an "SOC", or system-on-a-chip) that may be coupled to the HDD 200. In so doing, the FCA 256 is routed through an interface 250 (e.g., mechanical and/or electrical), which includes a small opening, which is associated with an HDD enclosure base 268 (e.g., similar to a hermetically-sealed version of HDD housing 168 of FIG. 1).

Figure 3A:
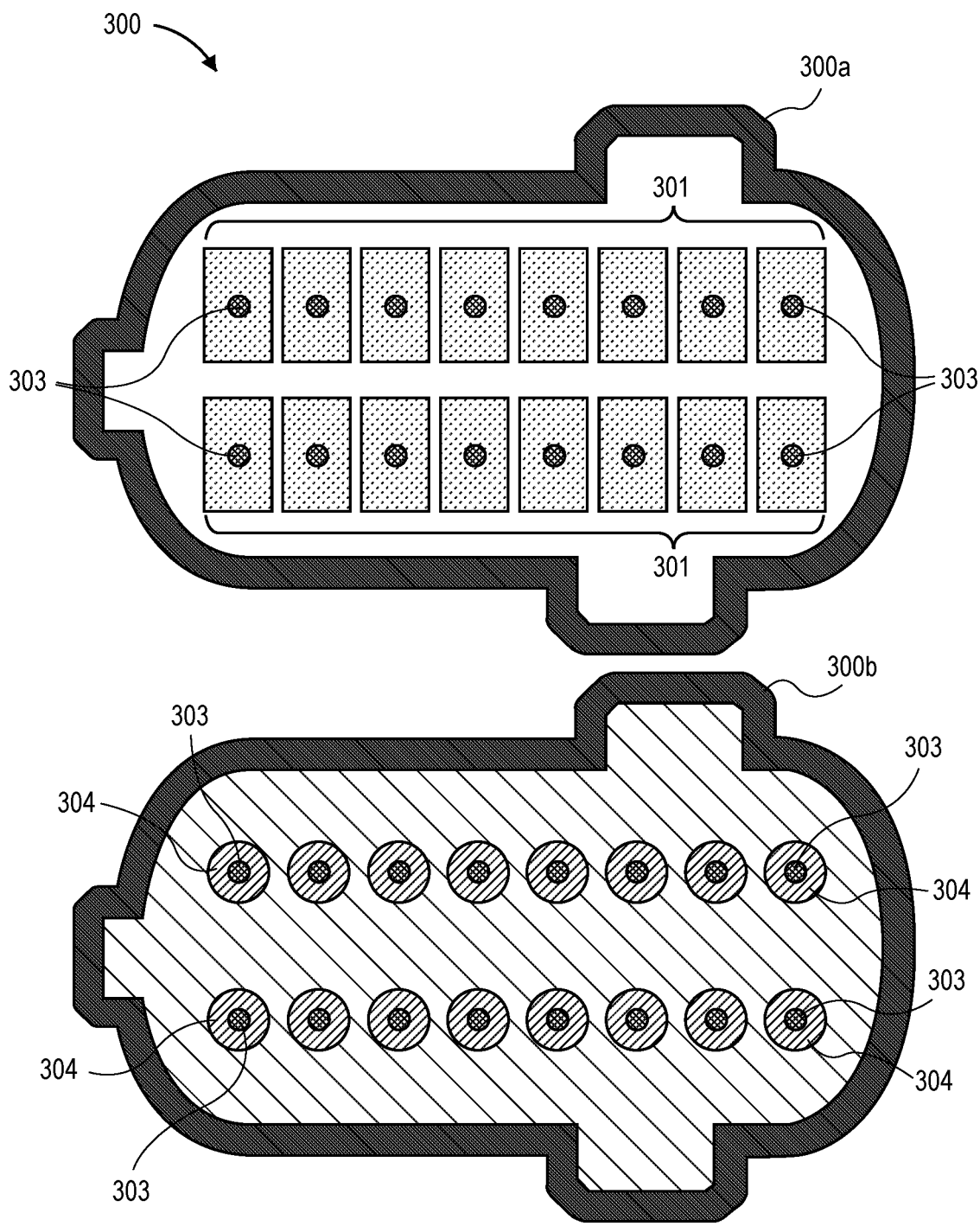
FIG. 3A is a top view illustrating layers of a sealed PCB feed-through board.
Figure 3B:
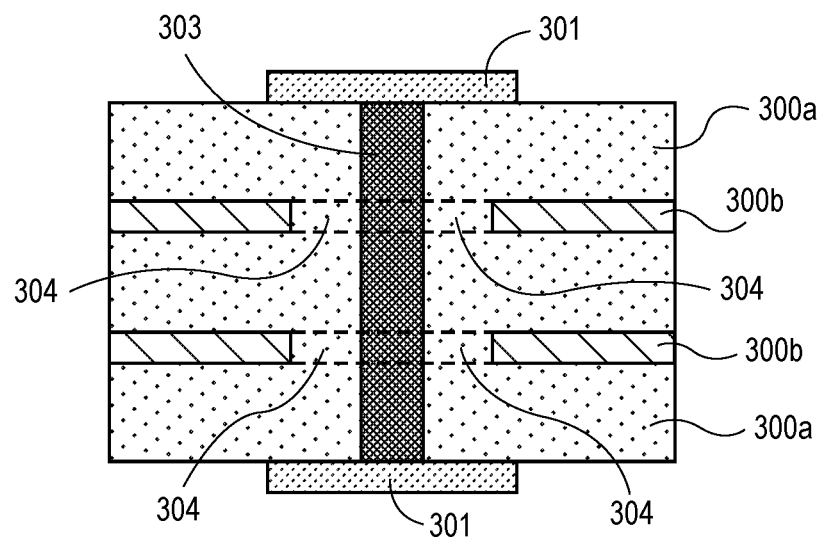
FIG. 3B is a cross-sectional side view illustrating the layers of the sealed PCB feed-through board of FIG. 3A.
Figure 3C:
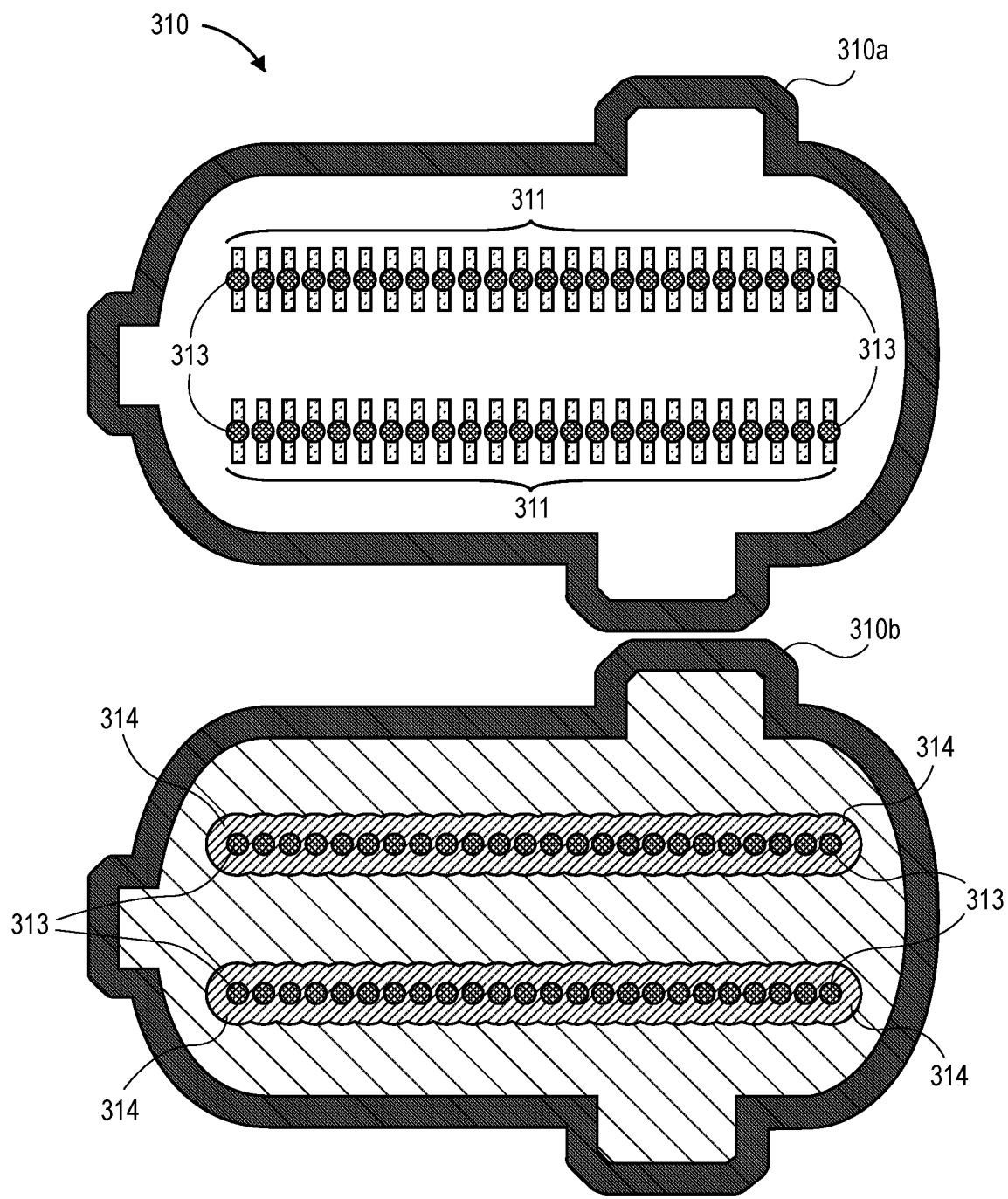
FIG. 3C is a top view illustrating layers of a sealed PCB feed-through board useable with a board-to-board (BTB) electrical connector.

FIG. 3A is a top view illustrating layers of a sealed PCB feed-through board, FIG. 3B is a cross-sectional side view illustrating the layers of the sealed PCB feed-through board of FIG. 3A, and FIG. 3C is a top view illustrating layers of a sealed PCB feed-through board useable with a board-to-board (BTB) electrical connector, each of which may be considered configurations on which the embodiments described herein may improve upon. With reference first to FIGS. 3A and 3B, feed-through board 300 comprises top and bottom insulator layers 300a (i.e., the upper portion in FIG. 3A) and one or more inner metal layers 300b (i.e., the lower portion in FIG. 3A) interposed between successive insulator layers 300a. Each insulator layer 300a comprises a plurality of electrical pads 301 thereon, each having a corresponding conductive through-hole 303 electrically connected therewith (each is not directly labeled). Each metal layer 300b comprises each through-hole 303 therethrough (each is not directly labeled), with an associated clearance 304 (each is not directly labeled) through the metal layer 300b and surrounding each through-hole 303.

With reference to FIG. 3C, use of board-to-board (BTB) type connectors with a PCB feed-through board such as board 300, may utilize a feed-through board 310, which similarly comprises top and bottom insulator layers 310a (i.e., the upper portion in FIG. 3C) and one or more inner metal layers 310b (i.e., the lower portion in FIG. 3C) interposed between successive insulator layers 310a, where each insulator layer 310a comprises a plurality of electrical pads 311 thereon with each having a through-hole 313 electrically connected therewith (each is not directly labeled). Each metal layer 310b comprises each through-hole 313 therethrough (each is not directly labeled), with an associated clearance 314 (each is not directly labeled) through the metal layer 310b and surrounding each through-hole 313. Note that the number of metal layers and insulator layers that may be constituent to a PCB feed-through in accordance with embodiments described herein may vary from implementation to implementation and, therefore, the configuration illustrated in FIG. 3B is for purposes of a non-limiting example.

As noted, flexible type electrical feed-throughs and PCB type electrical feed-throughs (such as illustrated in FIGS. 3A-3C) have tradeoffs. For example, while use of BTB connectors with a PCB feed-through board provides for a narrower pin pitch and therefore an increased pin number, the narrower pin pitch tends to lead to an undesirably large collection of clearances or clearance holes (e.g., clearance 314). Therefore, the collection of clearances corresponds to an absence of metal material in the metal layers (e.g., metal layers 300b, 310b), which would typically result in a higher and undesirable gas leak rate through such a PCB type feed-through because there is less metal present to form a barrier to gas leakage.

While the size of a PCB feed-through (e.g., the footprint) can be substantially equivalent to the size of a flex feed-through implemented with board-to-board (BTB) connectors, and therefore the aperture size on the base casting for a PCB feed-through can be substantially equivalent to the aperture size with a flex feed-through, a functionally equivalent PCB feed-through would likely have a higher helium leak rate than a flex feed-through because of the collection of clearances on each inner metal layer associated with the through holes connecting the top and bottom layers of the PCB board (see, e.g., FIG. 3B). Furthermore, the helium leak rate of a PCB feed-through would likely worsen if implemented with a BTB connector due to expanding the collection of clearances on each inner metal layer. Hence, because a BTB connector has a narrower pad pitch (see, e.g., FIG. 3C), and the pads for power, GND and VCM would need to be increased due to a lower rated/rating current than a conventional connector, one challenge with implementing a PCB feed-through with a BTB connector is reducing the chain of clearances of or for the through holes on the inner metal layer(s).

Low Leakage PCB Type Sealed Electrical Feed-Through Connector

Approaches described herein enable a reduction in the chain of clearance holes associated with the through-holes on the inner metal layer(s) to achieve a lower helium (or other lighter-than-air gas) leak rate. Stated otherwise, eliminating or reducing the size of the through-holes in the inner metal layer(s) reduces the corresponding clearance holes, thereby providing more leak resistant metal material within the inner metal layer(s). However, the size and positioning of the metal clearance holes is driven in part by the electrical performance of such a PCB type electrical feed-though, as well as by manufacturing processes, tooling, and the like.

Each electrical feed-through described herein may be referred to as a PCB (printed circuit board) based or type of feed-through, fabricated using materials and processes generally associated with PCBs. One advantage of using PCB-based components, generally, and a PCBelectrical feed-through, specifically, is the relatively low cost associated with a now mature fabrication approach. Note that, unless otherwise noted, an electrical feed-through may not have a true top and a true bottom so terms such as "top" and "bottom" may be used herein for purposes of reference and relative positioning rather than for a characterization of how a feed-through may be manufactured or assembled or installed as a sub-component of a larger, higher-level component (for a non-limiting example, a hermetically-sealed hard disk drive).

Generally, and according to embodiments, insulator layers referred to herein may comprise or be composed of a fiberglass material (e.g., a fiberglass fabric or cloth) that is pre-impregnated with epoxy resin (may be referred to in the art as "glass-epoxy resin", "glass-epoxy pre-preg", "epoxy resin prepreg", and the like), and/or a copper-clad laminate of fiberglass material (e.g., a fiberglass fabric or cloth) that is pre-impregnated with epoxy resin, and inner metal layers referred to herein may comprise or be composed of copper. Copper-clad refers to the glass-epoxy material being coated in a copper foil on both sides, which in this scenario is useful for imparting lower gas permeability to the glass-epoxy resin.

Figure 4:
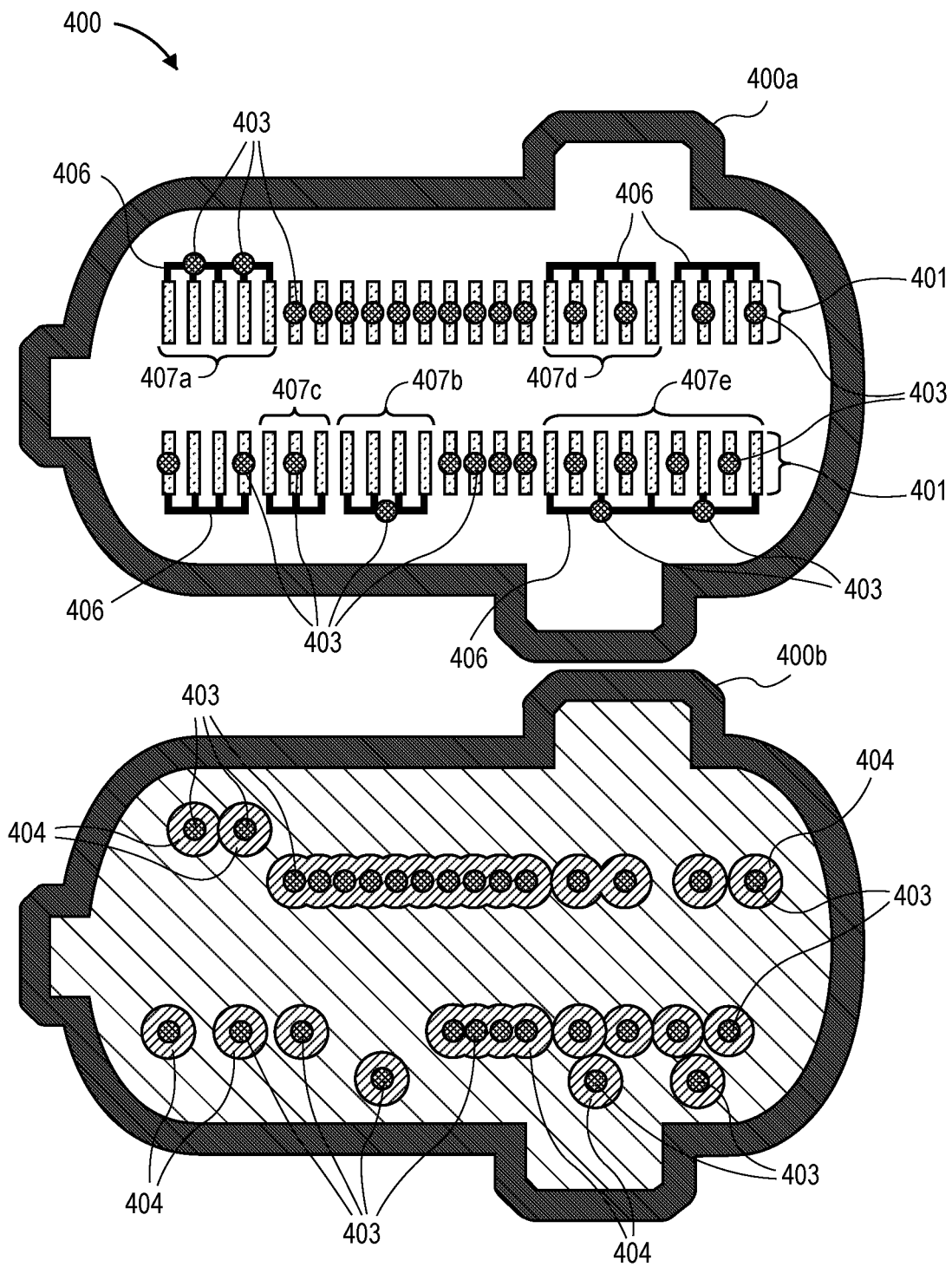
FIG. 4 is a top view illustrating layers of a sealed PCB feed-through board, according to an embodiment.

FIG. 4 is a top view illustrating layers of a sealed PCB feed-through board, according to an embodiment. Feed-through board 400 comprises top and bottom insulator layers 400a (i.e., the upper portion in FIG. 4) and one or more inner metal layers 400b (i.e., the lower portion in FIG. 4) interposed between successive insulator layers 400a. Each insulator layer 400a comprises a plurality of electrically conductive connector pads 401 ("electrical pads 401") thereon, each having a corresponding conductive through-hole 403 electrically connected therewith (for drawing clarity purposes, each is not directly labeled). According to an embodiment, each through-hole 403 is electrically conductive through use of an electrically conductive annulus positioned within or through each respective through-hole 403. Each metal layer 400b comprises each through-hole 403 therethrough (for drawing clarity purposes, each is not directly labeled), with an associated clearance 404 (for drawing clarity purposes, each is not directly labeled) through the metal layer 400b and surrounding each through-hole 403. According to an embodiment, the top and bottom insulator layers 400a are configured and constructed equivalently, i.e., each comprises the same or similar pattern of electrical pads 401 and through-holes 403 (and electrical traces, etc., where applicable), while their peripheral shapes may mirror each other. However, the configuration of the electrical pads 401 on each respective side of a feed-through board such as feed-through board 400 may vary from implementation to implementation. Hence, advantages of embodiments described herein remain if the number of electrical pads 401 differs from one side to the other, i.e., between the top and the bottom insulator layers 400a.

According to an embodiment, at (e.g., on or within) the insulator layers 400a, multiple connector pads 401 are electrically interconnected by use of one or more electrical traces 406 (a "set of traces 406") (for drawing clarity purposes, each is not directly labeled). For example, the connector pads 401 associated with signals having, requiring, operating with the same voltage can be linked together by a corresponding set of traces 406. For example and according to embodiments, connector pads 401 associated with a common voltage power signal are electrically interconnected by a corresponding set of traces 406, and/or connector pads 401 associated with a common voltage ground (GND) are electrically interconnected by a corresponding set of traces 406. Similarly, in the context of a hard disk drive such as illustrated and described in reference to FIG. 1, connector pads 401 associated with a common voltage VCM signal are electrically interconnected by a corresponding set of traces 406.

Another way to describe the foregoing configuration of the top and bottom insulator layers 400a is that each of the insulator layers 400a comprises at least one group of x number of connector pads 401 electrically interconnected by a set of traces 406, where each respective set of traces 406 on the top and bottom insulator layers 400a are electrically connected by way of y number of through-holes 403, and where they number of through-holes 403 is less than the x number of connector pads 401. According to an embodiment, the y number of through-holes 403 associated with a particular set of traces 406 electrically connect (e.g., directly) with that particular set of traces 406, such as illustrated by electrical configurations 407a, 407b, 407c. According to an embodiment, they number of through-holes 403 associated with a particular set of traces 406 electrically connect (e.g., directly) with a subset of the respective group of x number of connector pads 401, such as illustrated by electrical configurations 407c, 407d. Regardless of which type of the foregoing electrical configurations is implemented, what remains consistent is that the number of through-holes 403 constituent to the insulator layers 400a and, notably, the metal layer 400b is less than the number of connector pads 401 constituent to the insulator layers 400a, as exemplified in FIG. 4.

Figure 5:
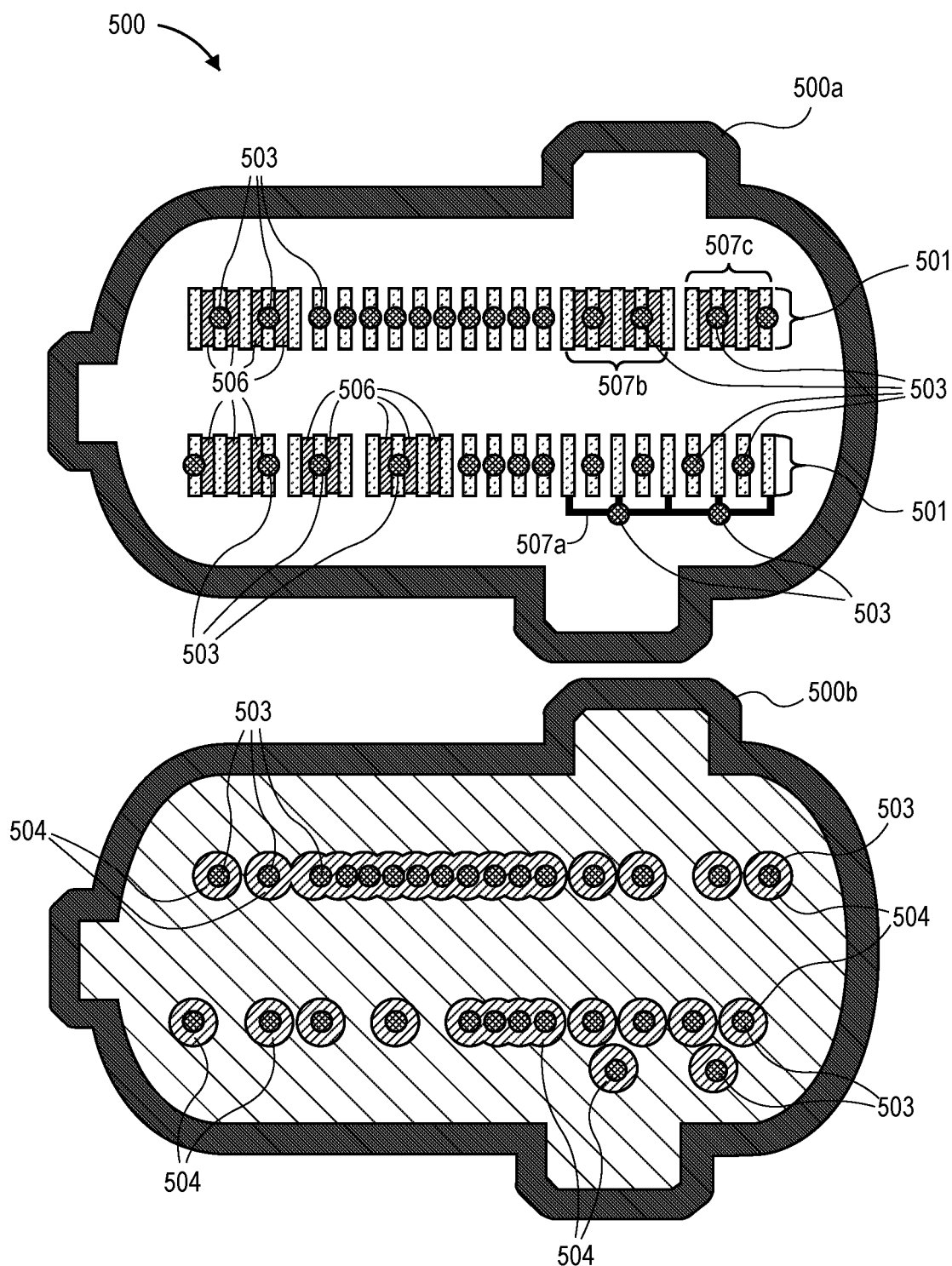
FIG. 5 is a top view illustrating layers of a sealed PCB feed-through board, according to an embodiment.

FIG. 5 is a top view illustrating layers of a sealed PCB feed-through board, according to an embodiment. The concept depicted with the feed-through board 500 of FIG. 5 is similar to the concept depicted in reference to feed-through board 400 (FIG. 4) except that, according to an embodiment, the x number of connector pads on the top and bottom insulator layers 500a are electrically interconnected in series by a set of traces 506, rather than, according to an embodiment, the x number of connector pads on the top and bottom insulator layers 400a (FIG. 4) are electrically interconnected in parallel by a set of traces 406 (FIG. 4).

Accordingly, feed-through board 500 comprises top and bottom insulator layers 500a (i.e., the upper portion in FIG. 5) and one or more inner metal layers 500b (i.e., the lower portion in FIG. 5) interposed between successive insulator layers 500a. Each insulator layer 500a comprises a plurality of electrically conductive connector pads 501 ("electrical pads 501") thereon, each having a corresponding conductive through-hole 503 electrically connected therewith (for drawing clarity purposes, each is not directly labeled). According to an embodiment, each through-hole 503 is electrically conductive through use of an electrically conductive annulus positioned within or through each respective through-hole 503. Each metal layer 500b comprises each through-hole 503 therethrough (for drawing clarity purposes, each is not directly labeled), with an associated clearance 504 (for drawing clarity purposes, each is not directly labeled) through the metal layer 500b and surrounding each through-hole 503. According to an embodiment, the top and bottom insulator layers 500a are configured and constructed equivalently, i.e., each comprises the same or similar pattern of electrical pads 501 and through-holes 503 (and electrical traces, etc., where applicable), while their peripheral shapes may mirror each other. However, the configuration of the electrical pads 501 on each respective side of a feed-through board such as feed-through board 500 may vary from implementation to implementation. Hence, advantages of embodiments described herein remain if the number of electrical pads 501 differs from one side to the other, i.e., between the top and the bottom insulator layers 500a.

According to an embodiment, at (e.g., on or within) the insulator layers 500a, multiple connector pads 501 are electrically interconnected in series by use of one or more electrical traces 506 (a "set of traces 506") (for drawing clarity purposes, each is not directly labeled). For example, the connector pads 501 associated with signals having, requiring, operating with the same voltage can be linked together by a corresponding set of traces 506, with reference back to FIG. 4 for example embodiments.

As with feed-through 400 (FIG. 4), each of the insulator layers 500a comprises at least one group of x number of connector pads 501 electrically interconnected by a set of traces 506, where each respective set of traces 506 on the top and bottom insulator layers 500a are electrically connected by way of y number of through-holes 503, and where the y number of through-holes 503 is less than the x number of connector pads 501. According to an embodiment, they number of through-holes 503 associated with a particular set of traces 506 electrically connect (e.g., directly) with that particular set of traces 506, such as illustrated by electrical configurations 507a. According to an embodiment, they number of through-holes 503 associated with a particular set of traces 506 electrically connect (e.g., directly) with a subset of the respective group of x number of connector pads 501, such as illustrated by electrical configurations 507b, 507c. Regardless of which type of the foregoing electrical configurations is implemented, what remains consistent is that the number of through-holes 503 constituent to the insulator layers 500a and, notably, the metal layer 500b is less than the number of connector pads 501 constituent to the insulator layers 500a.

Figure 6A:
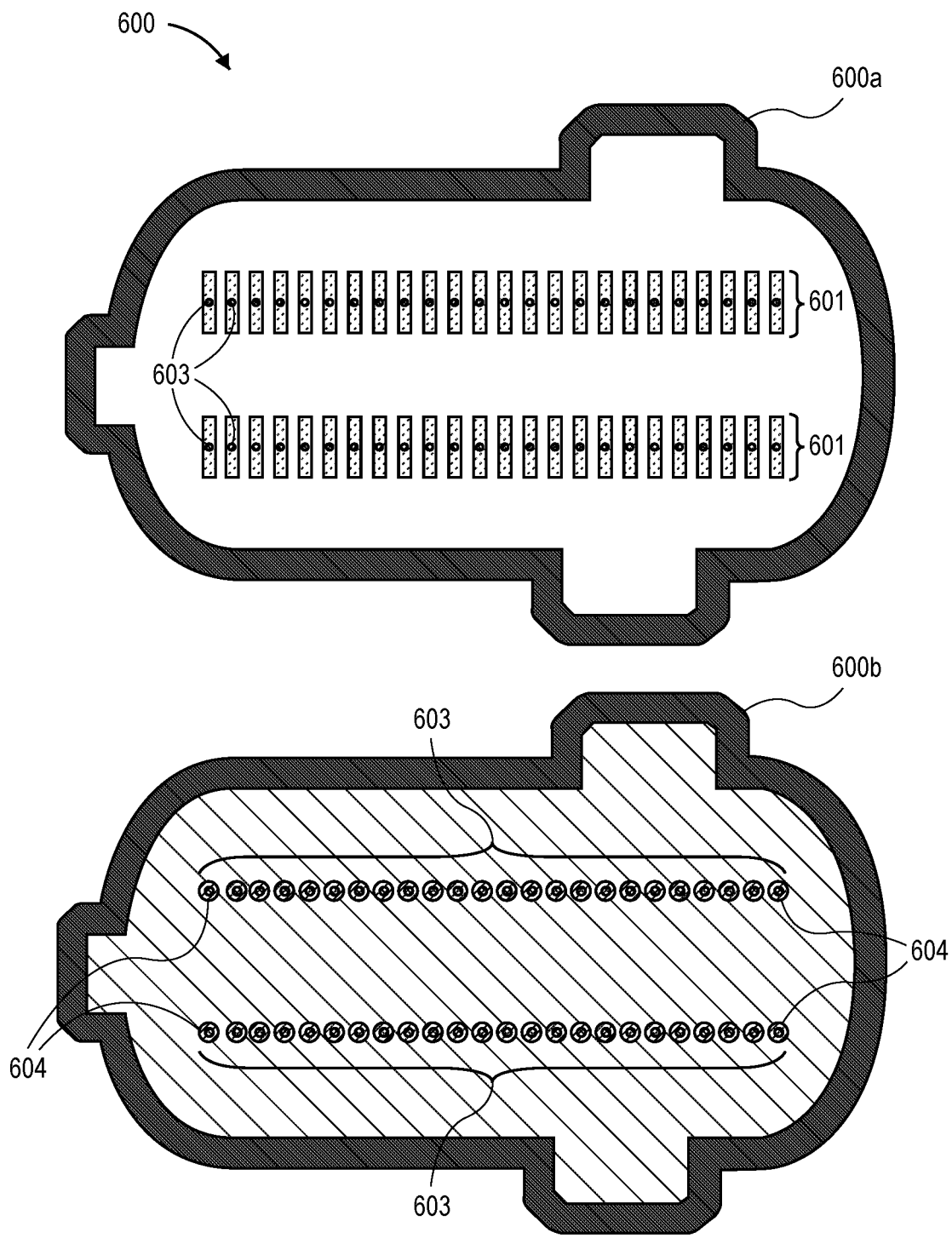
FIG. 6A is a top view illustrating layers of a sealed PCB feed-through board, according to an embodiment.
Figure 6B:
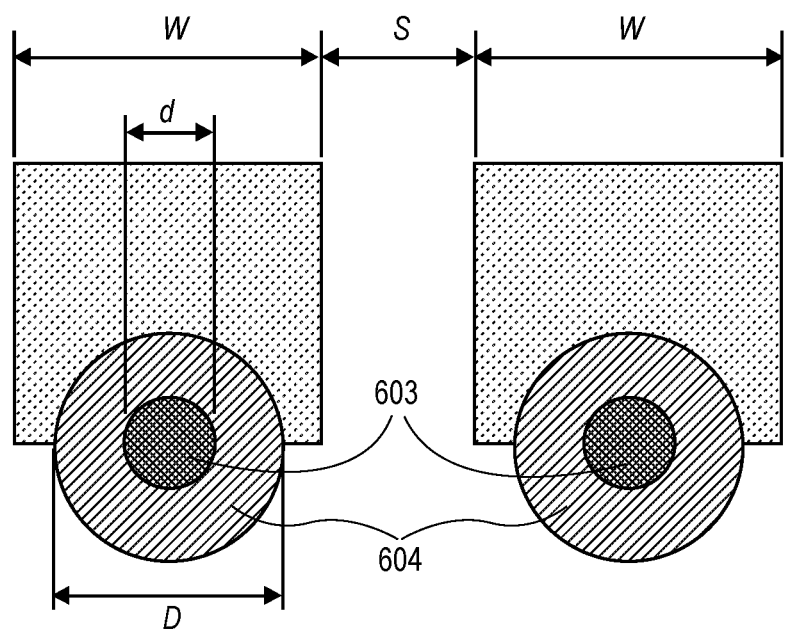
FIG. 6B is a top view illustrating smaller through-holes for the sealed PCB feed-through board of FIG. 6A, according to an embodiment.

FIG. 6A is a top view illustrating layers of a sealed PCB feed-through board, according to an embodiment, and FIG. 6B is a top view illustrating smaller through-holes for the sealed PCB feed-through board of FIG. 6A, according to an embodiment. The approach to reducing the chain of clearance holes illustrated in FIGS. 6A, 6B involves utilizing through-holes having a relatively smaller diameter than is common or typical for PCB connector feed-through assemblies.

Feed-through board 600 comprises top and bottom insulator layers 600a (i.e., the upper portion in FIG. 6A) and one or more inner metal layers 600b (i.e., the lower portion in FIG. 6A) interposed between successive insulator layers 600a. Each insulator layer 600a comprises a plurality of electrically conductive connector pads 601 ("electrical pads 601") thereon, each having a corresponding conductive through-hole 603 electrically connected therewith (for drawing clarity purposes, each is not directly labeled). According to an embodiment, each through-hole 603 is electrically conductive through use of an electrically conductive annulus positioned within or through each respective through-hole 603. Each metal layer 600b comprises each through-hole 603 therethrough (for drawing clarity purposes, each is not directly labeled), with an associated clearance 604 (for drawing clarity purposes, each is not directly labeled) through the metal layer 600b and surrounding each through-hole 603. According to an embodiment, the top and bottom insulator layers 600a are configured and constructed equivalently, i.e., each comprises the same or similar pattern of electrical pads 601 and through-holes 603 (and electrical traces, etc., where applicable), while their peripheral shapes may mirror each other. However, the configuration of the electrical pads 601 on each respective side of a feed-through board such as feed-through board 600 may vary from implementation to implementation. Hence, advantages of embodiments described herein remain if the number of electrical pads 601 differs from one side to the other, i.e., between the top and the bottom insulator layers 600a.

According to an embodiment and with reference to FIG. 6B, clearance holes associated with through-holes with a smaller diameter, d (e.g., through-holes 603), are defined as meeting the following relation:

$$D < W + S \qquad (1)$$

where D=diameter of clearance;
W=pad width;
S=distance between pads.

However, while effective at reducing the chain of clearance holes and the relative absence of metal in the metal layer 600b, manufacturing a feed-through board with smaller diameter through-holes such as feed-through board 600 with through-holes 603 may necessitate new/uncommon manufacturing tooling, which may be more costly than use of established/common tooling.

Figure 7:
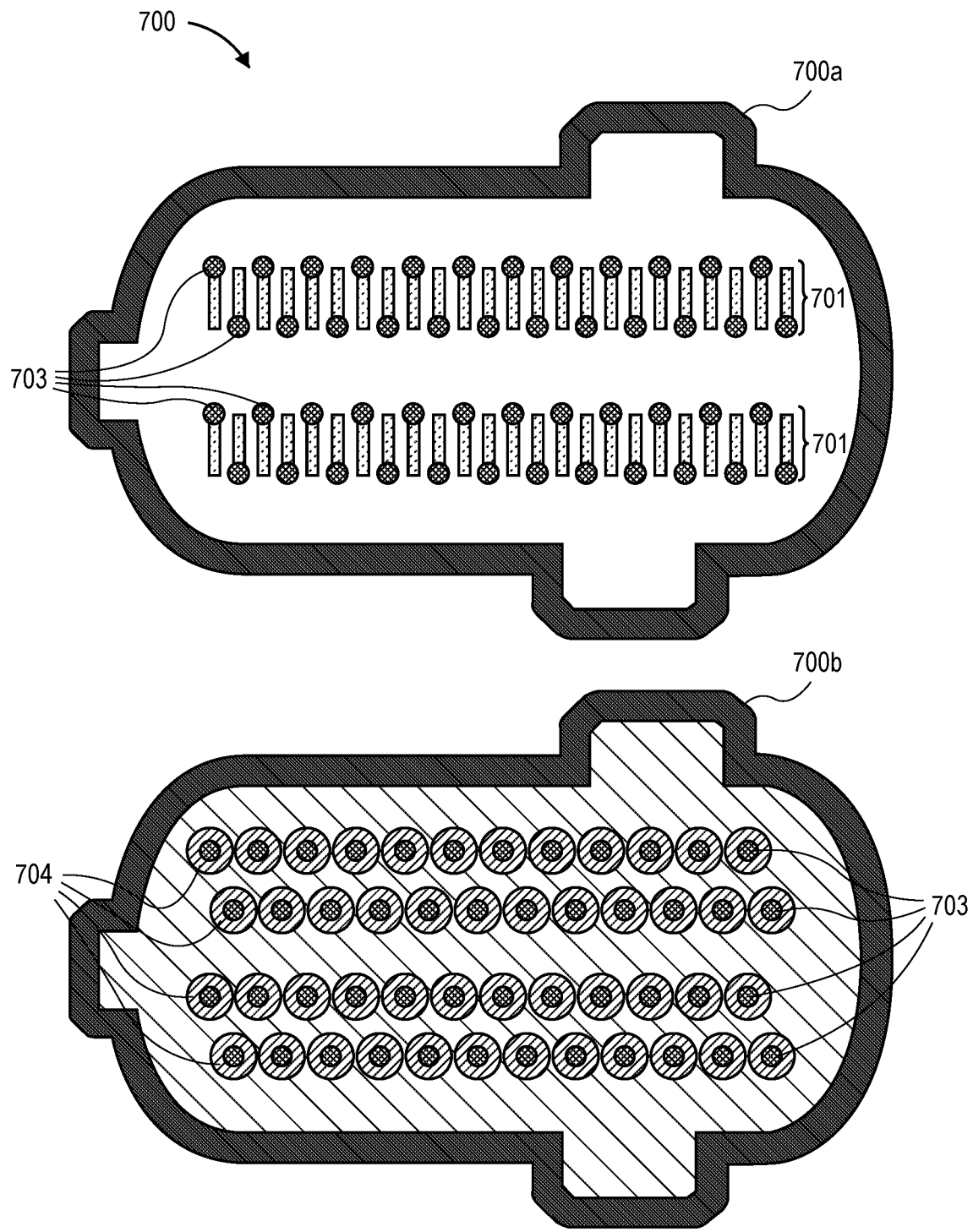
FIG. 7 is a top view illustrating layers of a sealed PCB feed-through board, according to an embodiment.

FIG. 7 is a top view illustrating layers of a sealed PCB feed-through board, according to an embodiment. The approach to reducing the chain of clearance holes illustrated in FIG. 7 involves positioning the through-holes in a zigzag formation, whereby the through-holes are configured alternately relative to each end or side of corresponding connector pads.

Feed-through board 700 comprises top and bottom insulator layers 700a (i.e., the upper portion in FIG. 7) and one or more inner metal layers 700b (i.e., the lower portion in FIG. 7) interposed between successive insulator layers 700a. Each insulator layer 700a comprises a plurality of electrically conductive connector pads 701 ("electrical pads 701") thereon, each having a corresponding conductive through-hole 703 electrically connected therewith (for drawing clarity purposes, each is not directly labeled). According to an embodiment, each through-hole 703 is electrically conductive through use of an electrically conductive annulus positioned within or through each respective through-hole 703. Each metal layer 700b comprises each through-hole 703 therethrough (for drawing clarity purposes, each is not directly labeled), with an associated clearance 704 (for drawing clarity purposes, each is not directly labeled) through the metal layer 700b and surrounding each through-hole 703. According to an embodiment, the top and bottom insulator layers 700a are configured and constructed equivalently, i.e., each comprises the same or similar pattern of electrical pads 701 and through-holes 703 (and electrical traces, etc., where applicable), while their peripheral shapes may mirror each other. However, the configuration of the electrical pads 701 on each respective side of a feed-through board such as feed-through board 700 may vary from implementation to implementation. Hence, advantages of embodiments described herein remain if the number of electrical pads 701 differs from one side to the other, i.e., between the top and the bottom insulator layers 700a.

By alternating the positions of adjacent through-holes 703 relative to corresponding electrical pads 701, e.g., in a zigzag shape or manner as illustrated in FIG. 7, the metal constituent to metal layer 700b can be located in a favorable position or pattern for electrical performance purposes, while not necessarily requiring special or uncommon processes and/or tooling such as what may be needed for manufacturing much smaller through-holes as illustrated and described in reference to FIGS. 6A, 6B. Thus, common tooling can be used, desirable electrical performance can be maintained, and a suitable leak rate can be maintained, while providing a high electrical pad density such as needed for use of BTB connectors with a sealed PCBelectrical feed-through such as feed-through 700.

Figure 8:
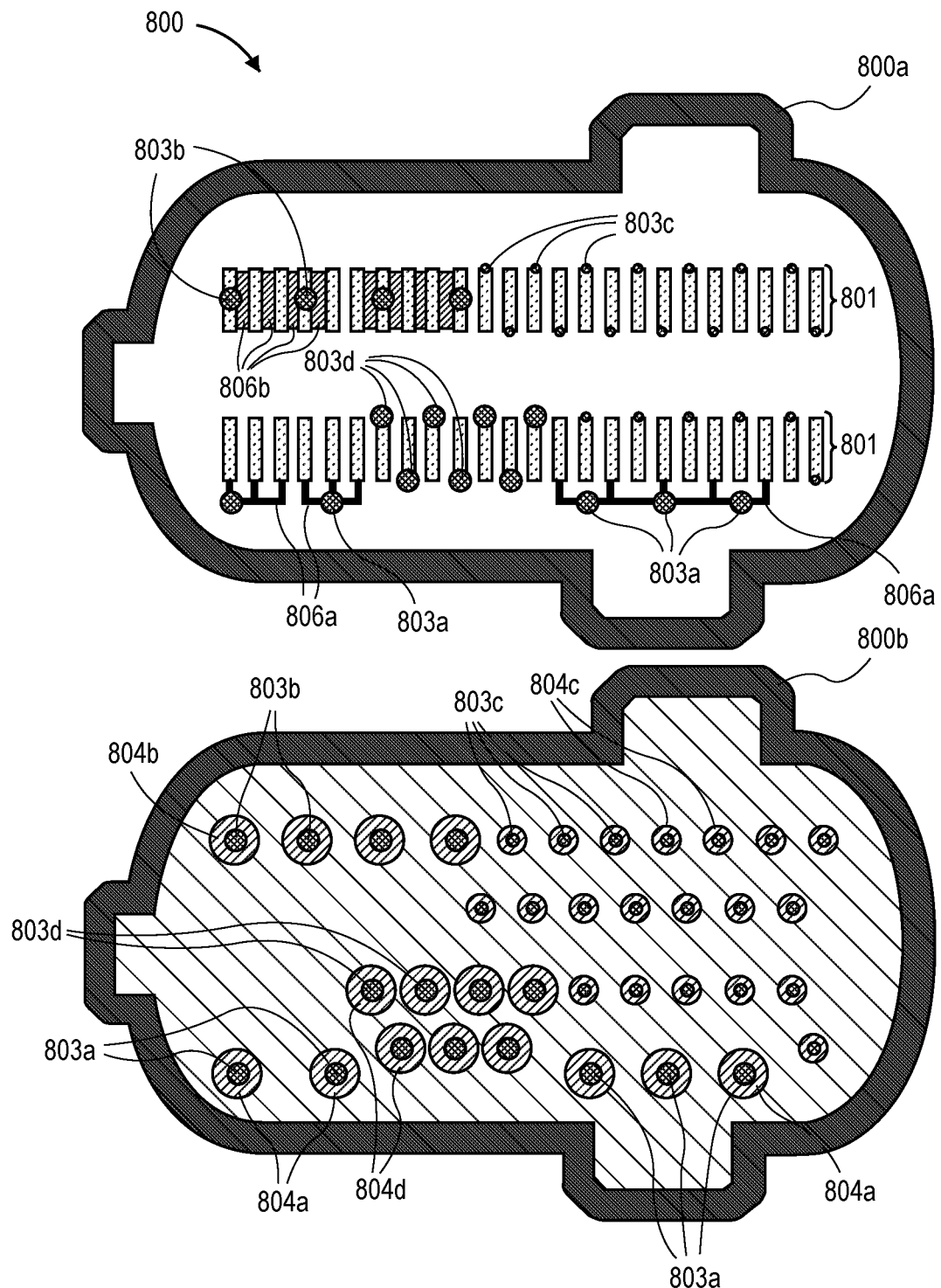
FIG. 8 is a top view illustrating layers of a sealed PCB feed-through board, according to an embodiment.

FIG. 8 is a top view illustrating layers of a sealed PCB feed-through board, according to an embodiment. The approach to reducing the chain of clearance holes illustrated in FIG. 8 involves a combination of approaches as illustrated and described in reference to FIGS. 4, 5, 6A, and 7. Note that while all of the foregoing approaches to reducing the chain of clearances are illustrated and described in reference to FIG. 8, which approaches to use for a given feed-through design may vary from implementation to implementation and, therefore, not all of the foregoing approaches have to be implemented in combination with each other.

Feed-through board 800 comprises top and bottom insulator layers 800a (i.e., the upper portion in FIG. 8) and one or more inner metal layers 800b (i.e., the lower portion in FIG. 8) interposed between successive insulator layers 800a. Each insulator layer 800a comprises a plurality of electrically conductive connector pads 801 ("electrical pads 801") thereon, each having a corresponding conductive through-hole 803a, 803b, 803c, or 803d (generally, "through-hole 803"), electrically connected therewith (for drawing clarity purposes, each is not directly labeled). According to an embodiment, each through-hole 803 is electrically conductive through use of an electrically conductive annulus positioned within or through each respective through-hole 803. Each metal layer 800b comprises each through-hole 803 therethrough (for drawing clarity purposes, each is not directly labeled), with an associated clearance 804a, 804b, 804c, or 804d (generally, "clearance 804") (for drawing clarity purposes, each is not directly labeled) through the metal layer 800b and surrounding each through-hole 803. According to an embodiment, the top and bottom insulator layers 800a are configured and constructed equivalently, i.e., each comprises the same or similar pattern of electrical pads 801 and through-holes 803 (and electrical traces, etc., where applicable), while their peripheral shapes may mirror each other. However, the configuration of the electrical pads 801 on each respective side of a feed-through board such as feed-through board 800 may vary from implementation to implementation. Hence, advantages of embodiments described herein remain if the number of electrical pads 801 differs from one side to the other, i.e., between the top and the bottom insulator layers 800a.

According to an embodiment, at (e.g., on or within) the insulator layers 800a, multiple connector pads 801 are electrically interconnected by use of one or more electrical traces 806a (a "set of traces 806a") (for drawing clarity purposes, each is not directly labeled). For example, the connector pads 801 associated with signals having, requiring, operating with the same voltage can be linked together by a corresponding set of traces 806a. For example and according to embodiments, connector pads 801 associated with a common voltage power signal are electrically interconnected by a corresponding set of traces 806a, and/or connector pads 801 associated with a common voltage ground (GND) are electrically interconnected by a corresponding set of traces 806a. Similarly, in the context of a hard disk drive such as illustrated and described in reference to FIG. 1, connector pads 801 associated with a common voltage VCM signal are electrically interconnected by a corresponding set of traces 806a. Thus, metal layer 800b comprises at least one through-hole 803a therethrough (for drawing clarity purposes, each is not directly labeled), with an associated clearance 804a (for drawing clarity purposes, each is not directly labeled) through the metal layer 800b and surrounding each through-hole 803a.

According to an embodiment, at (e.g., on or within) the insulator layers 800a, multiple connector pads 801 are electrically interconnected in series by use of one or more electrical traces 806b (a "set of traces 806b") (for drawing clarity purposes, each is not directly labeled). For example, the connector pads 801 associated with signals having, requiring, operating with the same voltage can be linked together by a corresponding set of traces 806b. Thus, metal layer 800b comprises at least one through-hole 803b therethrough (for drawing clarity purposes, each is not directly labeled), with an associated clearance 804b (for drawing clarity purposes, each is not directly labeled) through the metal layer 800b and surrounding each through-hole 803b.

According to an embodiment, another approach to reducing the chain of clearance holes illustrated in FIG. 8 involves utilizing through-holes having a relatively smaller diameter than is common or typical for PCB feed-through connector assemblies (refer to FIGS. 6A, 6B and corresponding description), whereby the clearance holes associated with the through-holes with a smaller diameter, d (e.g., through-holes 803c), are defined as meeting the foregoing relation characterized in equation (1) above. Thus, metal layer 800b comprises at least one smaller diameter through-hole 803c therethrough (for drawing clarity purposes, each is not directly labeled), with an associated clearance 804c (for drawing clarity purposes, each is not directly labeled) through the metal layer 800b and surrounding each through-hole 803c.

According to an embodiment, another approach to reducing the chain of clearance holes illustrated in FIG. 8 involves positioning the through-holes in a zigzag formation, whereby the through-holes are configured alternately relative to each end or side of corresponding connector pads (refer to FIG. 7 and corresponding description). For example, by alternating the positions of adjacent through-holes 803d relative to corresponding electrical pads 801 (e.g., in a zigzag shape or manner), the metal constituent to metal layer 800b can be located in a favorable position or pattern for electrical performance purposes, while not necessarily requiring costly special or uncommon processes and/or tooling. Thus, metal layer 800b comprises at least one through-hole 803d therethrough (for drawing clarity purposes, each is not directly labeled), with an associated clearance 804d (for drawing clarity purposes, each is not directly labeled) through the metal layer 800b and surrounding each through-hole 803d.

Method for Manufacturing an Electrical Feed-Through Part

Figure 9:
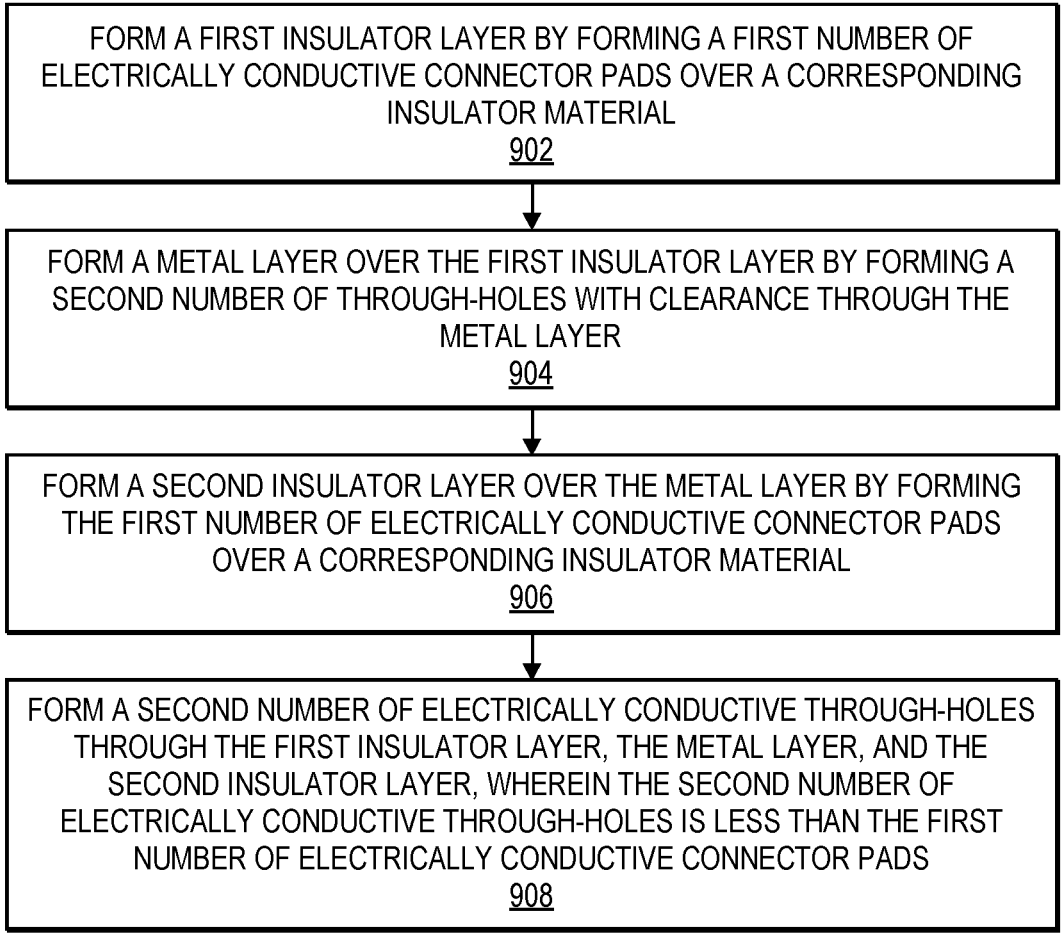
FIG. 9 is a flowchart illustrating a method of manufacturing an electrical feed-through part, according to an embodiment.

FIG. 9 is a flowchart illustrating a method of manufacturing an electrical feed-through part, according to an embodiment.

At block 902, a first insulator layer is formed, by forming a first number of electrically conductive connector pads over a corresponding insulator material. For example, a bottom insulator layer 400a (FIG. 4), 500a (FIG. 5), 600a (FIG. 6A), 700a (FIG. 7), and/or 800a (FIG. 8) is formed by forming respective connector pads 401 (FIG. 4), 501 (FIG. 5), 601 (FIG. 6A), 701 (FIG. 7), 801 (FIG. 8) over the core insulating material.

At block 904, a metal layer is formed over the first insulator layer, by forming a second number of through-holes with clearance through the metal layer. For example, an inner metal layer 400b (FIG. 4), 500b (FIG. 5), 600b (FIG. 6A), 700b (FIG. 7), and/or 800b (FIG. 8) is formed by forming respective through-holes 403 (FIG. 4), 503 (FIG. 5), 603 (FIG. 6A), 703 (FIG. 7), 803 (FIG. 8), with associated clearance holes/clearances 404 (FIG. 4), 504 (FIG. 5), 604 (FIG. 6A), 704 (FIG. 7), 804 (FIG. 8), over the previous insulator layer formed at block 902.

At block 906, a second insulator layer is formed over the metal layer, by forming the first number of electrically conductive connector pads over a corresponding insulator material. For example, a top insulator layer 400a (FIG. 4), 500a (FIG. 5), 600a (FIG. 6A), 700a (FIG. 7), and/or 800a (FIG. 8) is formed by forming respective connector pads 401 (FIG. 4), 501 (FIG. 5), 601 (FIG. 6A), 701 (FIG. 7), 801 (FIG. 8) over the core insulating material.

At block 908, the second number of electrically conductive through-holes are formed through the first insulator layer, the metal layer, and the second insulator layer, wherein the second number of through-holes is less than the first number of electrically conductive connector pads (e.g., where they number of through-holes is less than the x number of connector pads). As such, according to an embodiment the top insulator layer and the bottom insulator layer (and, likewise, the corresponding connector pads) are electrically connected by way of an electrically conductive annulus positioned within and/or through each of the through-holes. Whether each of the portions of the electrically conductive through-holes that is formed in/through each respective layer is formed at the layer level of manufacturing or at the assembly level of manufacturing may vary from implementation to implementation.

The various blocks of FIG. 9 involving forming the layers, forming the connector pads, forming the through-holes, and the like, may utilize one or more of the approaches to reducing the chain of clearance holes illustrated and described herein throughout. Thus, a lower leak rate electrical feed-through is enabled by reducing the chain of clearance holes associated with the through-holes on the inner metal layer and, consequently, providing more leak resistant metal material within the inner metal layer, while maintaining suitable electrical performance and avoiding much if any disruption of existing manufacturing processes, tooling, and the like.

EXTENSIONS AND ALTERNATIVES

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. An electrical feed-through configured to interface between a hermetically-sealed environment and an external environment, the feed-through comprising:
    a top insulator layer comprising a first number of electrically conductive connector pads formed over a corresponding insulator material and a second number of through-holes electrically connected with a corresponding one or more connector pads;
    a bottom insulator layer comprising a second number of electrically conductive connector pads formed over a corresponding insulator material and the second number of through-holes electrically connected with a corresponding one or more connector pads; and
    a metal inner layer interposed between the top insulator layer and the bottom insulator layer and comprising the second number of through-holes;

wherein the second number of through-holes is less than the first number of electrically conductive connector pads.

2. The electrical feed-through of claim 1, wherein the top insulator layer and the bottom insulator layer are electrically connected by way of an electrically conductive annulus positioned within each of the through-holes.

3. The electrical feed-through of claim 1, wherein:
at least one of the top insulator layer and the bottom insulator layer further comprises a group of x number of the connector pads electrically interconnected by one or more electrical traces;
the one or more electrical traces on the top insulator layer and the one or more electrical traces on the bottom insulator layer are electrically connected by way of y number of the through-holes; and
the y number of the through-holes is less than the x number of the connector pads.

4. The electrical feed-through of claim 3, wherein the y number of through-holes electrically connect with the respective one or more electrical traces on the at least one of the top and bottom insulator layers.

5. The electrical feed-through of claim 3, wherein the y number of through-holes electrically connect with a subset of the respective group of x number of the connector pads on the at least one of the top and bottom insulator layers.

6. The electrical feed-through of claim 3, wherein each of the x number of the connector pads corresponds to a common voltage power signal.

7. The electrical feed-through of claim 3, wherein each of the x number of the connector pads corresponds to a common voltage ground.

8. The electrical feed-through of claim 3, wherein the x number of the connector pads are electrically interconnected in series.

9. The electrical feed-through of claim 3, wherein the x number of the connector pads are electrically interconnected in parallel.

10. The electrical feed-through of claim 1, wherein:
each of the through-holes in the metal inner layer has a diameter d and is enclosed by a larger clearance hole having a diameter D; and
diameter D is less than a sum of a width W of the connector pads and a distance S between the connector pads.

11. The electrical feed-through of claim 1, wherein at least some of the through-holes in each of the layers are configured alternately relative to each end of a corresponding connector pad.

12. A hermetically-sealed hard disk drive comprising the electrical feed-through of claim 1.

13. A method of manufacturing an electrical feed-through part, the method comprising:
forming a first insulator layer by forming a first number of electrically conductive connector pads over a corresponding insulator material;
forming a metal layer over the first insulator layer by forming a second number of through-holes with clearance through the metal layer;
forming a second insulator layer over the metal layer by forming a second number of electrically conductive connector pads over a corresponding insulator material; and
forming a second number of electrically conductive through-holes through the first insulator layer, the metal layer, and the second insulator layer;
wherein the second number of electrically conductive through-holes is less than each of the first and the second number of electrically conductive connector pads.

14. The method of claim 13, wherein:
forming the first insulator layer further comprises forming one or more electrical traces to electrically interconnect a group of x number of the first number of connector pads;
forming the second insulator layer further comprises forming one or more electrical traces to electrically interconnect a group of the second number of connector pads;
forming the through-holes further comprises forming a group of y number of the through-holes to electrically connect the one or more electrical traces on the top insulator layer with the one or more electrical traces on the bottom insulator layer, wherein the y number of the through-holes is less than the x number of the connector pads.

15. The method of claim 14, wherein forming the through-holes further comprises forming the y number of through-holes to electrically connect with the respective one or more electrical traces on the first and second insulator layers.

16. The method of claim 14, wherein forming the through-holes further comprises forming the y number of through-holes to electrically connect with a subset of the group of x number of the connector pads on the first insulator layer.

17. The method of claim 14, wherein forming the respective one or more electrical traces on the top insulator layer further comprises electrically interconnecting the x number of the connector pads in series.

18. The method of claim 14, wherein forming the respective one or more electrical traces on the top insulator layer further comprises electrically interconnecting the x number of the connector pads in parallel.

19. The method of claim 13, wherein forming the through-holes further comprises forming at least some of the through-holes in each of the layers alternately relative to each end of a corresponding connector pad.

20. A hermetic electrical feed-through comprising:
first means for providing a first plurality of electrical connections on a first side of the feed-through;
second means for providing a second plurality of electrical connections on a second opposing side of the feed-through;
means for inhibiting gas leakage through the feed-through, interposed between the first means and the second means; and
means for electrically connecting the first plurality of electrical connections and the second plurality of electrical connections through the interpositioned means for inhibiting gas leakage, wherein the number of each of the first plurality of electrical connections and the second plurality of electrical connections exceeds the number of means for electrically connecting the first plurality of electrical connections and the second plurality of electrical connections.

21. A hard disk drive comprising the hermetic electrical feed-through of claim 20.

* * * * *